BEST AVAILABLE COPY
A. Trahern, H. Heberling, W. E. Lukens & J. Heberling,
Horse Power.
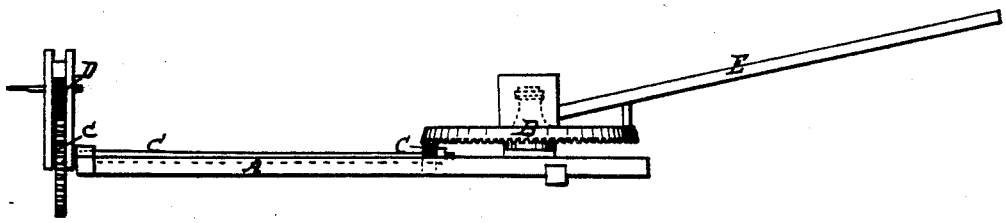
A. I. No. 3. Renewed Apr. 4, 1838.